(12) United States Patent
Choi et al.

(10) Patent No.: US 12,249,460 B2
(45) Date of Patent: *Mar. 11, 2025

(54) FILM CAPACITOR, POWER CONVERTING DEVICE, AND VEHICLE INCLUDING THE SAME

(71) Applicants: LG Magna E-Powertrain Co., Ltd., Incheon (KR); RUBYCON CORPORATION, Ina (JP)

(72) Inventors: Sungtae Choi, Seoul (KR); Takahisa Makino, Shimoina-Gun (JP)

(73) Assignees: LG MAGNA E-POWERTRAIN CO., LTD., Incheon (KR); RUBYCON CORPORATION, Ina (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/391,124

(22) Filed: Dec. 20, 2023

(65) Prior Publication Data

US 2024/0153707 A1    May 9, 2024

Related U.S. Application Data

(63) Continuation of application No. 17/780,680, filed as application No. PCT/KR2019/016750 on Nov. 29, 2019, now Pat. No. 11,967,465.

(51) Int. Cl.
*H01G 4/38* (2006.01)
*H01G 4/18* (2006.01)
*H02M 1/32* (2007.01)

(52) U.S. Cl.
CPC ............... *H01G 4/18* (2013.01); *H01G 4/38* (2013.01); *H02M 1/32* (2013.01)

(58) Field of Classification Search
None
See application file for complete search history.

(56) References Cited

U.S. PATENT DOCUMENTS

| 10,068,706 | B2 | 9/2018 | Baer et al. | |
| 11,967,465 | B2* | 4/2024 | Choi | H01G 4/18 |
| 2005/0168919 | A1 | 8/2005 | Welsch et al. | |
| 2008/0273289 | A1 | 11/2008 | Saito et al. | |
| 2009/0047541 | A1 | 2/2009 | Munshi | |
| 2010/0172066 | A1 | 7/2010 | Baer et al. | |
| 2011/0110015 | A1 | 5/2011 | Zhang et al. | |
| 2016/0079000 | A1 | 3/2016 | Koito | |

FOREIGN PATENT DOCUMENTS

| CN | 108780700 B | 10/2020 | |
| JP | 2009-200378 A | 9/2009 | |
| WO | WO-2017163660 A1 * | 9/2017 | H01G 4/005 |

* cited by examiner

*Primary Examiner* — Dion R. Ferguson
(74) *Attorney, Agent, or Firm* — Birch, Stewart, Kolasch & Birch, LLP

(57) ABSTRACT

A film capacitor for positioning at a direct current (DC) terminal at a front end of an inverter having a plurality of switching elements, can include a first member, and a second member surrounding the first member, in which a first thickness of the first member is greater than a second thickness of the second member.

18 Claims, 18 Drawing Sheets

【Figure 6a】
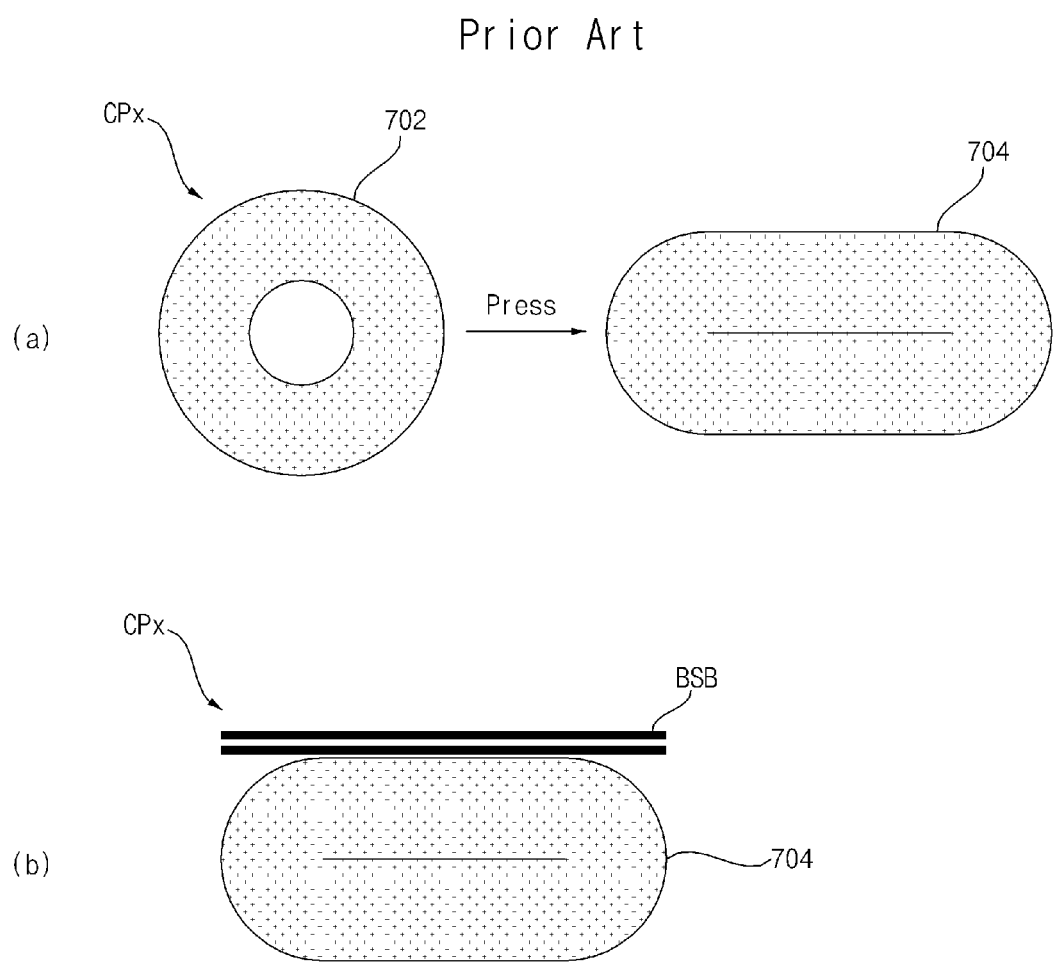

【Figure 6b】
(a) 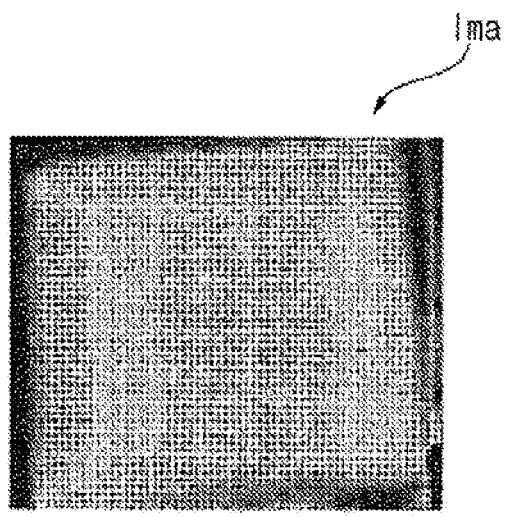
(b) 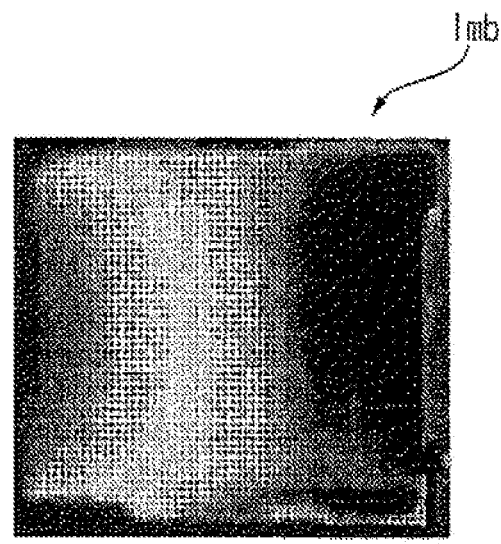

[Figure 7]
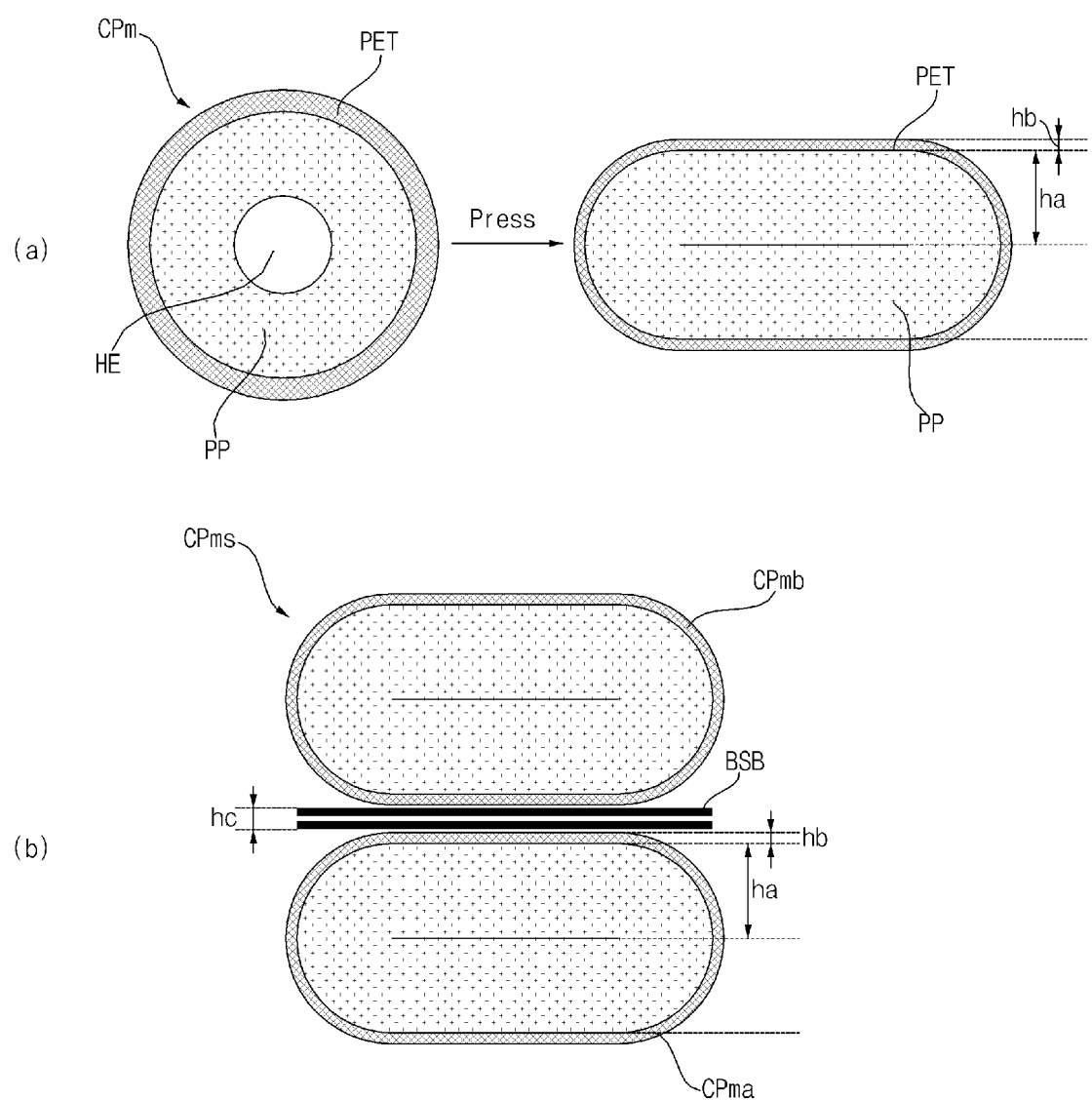

【Figure 8a】
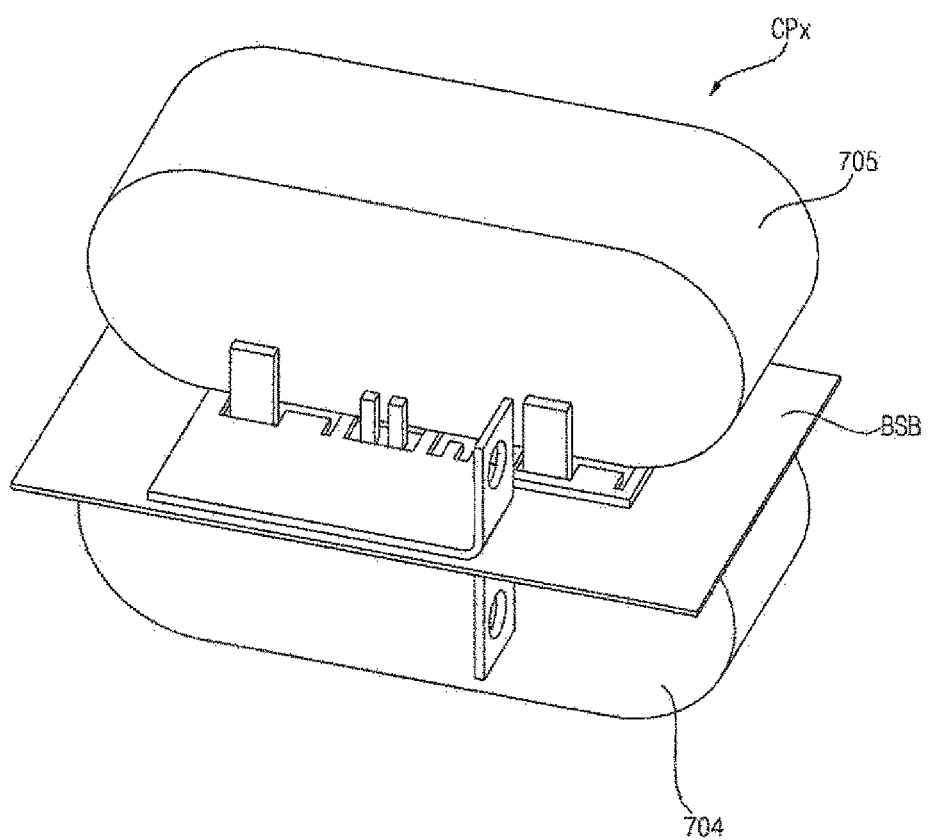

【Figure 8b】
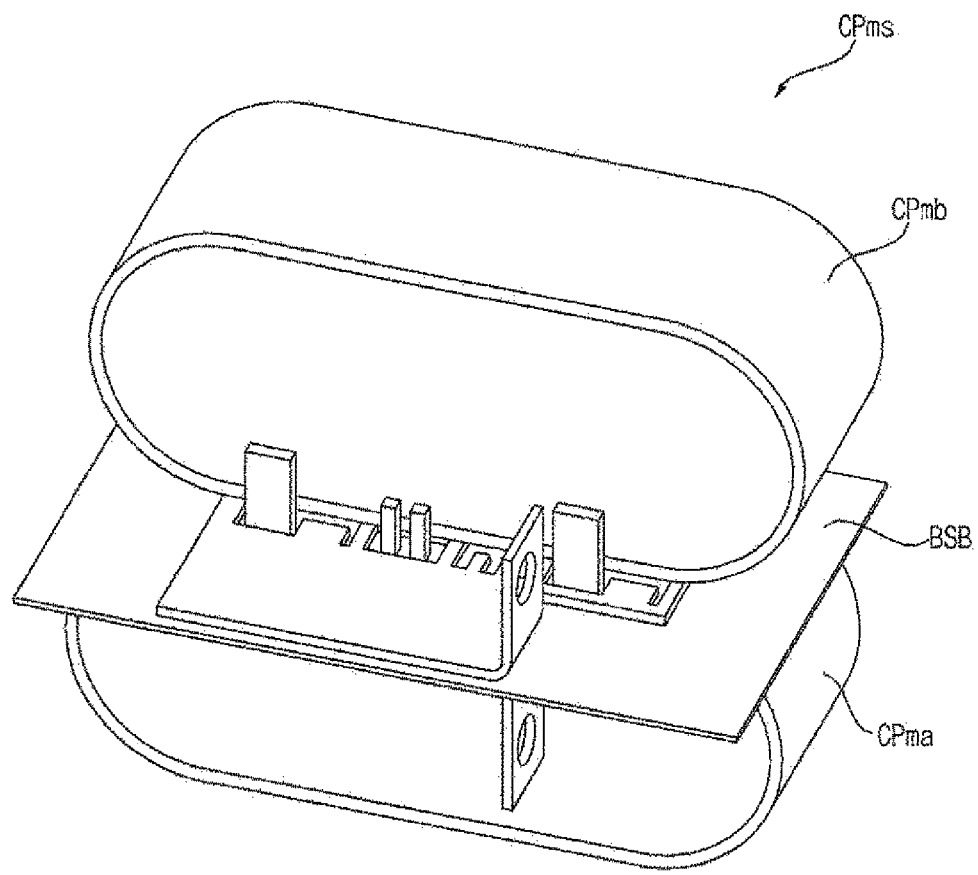
【Figure 9】
| PP | SPECIFIC GRAVITY | MELTING POINT | RELATIVE DIELECTRIC CONSTANT(%) | WITHSTAND VOLTAGE(V/um) | DIELECTRIC LOSS |
|---|---|---|---|---|---|
| PP | 0.91 | 169 | 2.2 | 450 | 0.03 |
| PET | 1.40 | 257 | 3.1 | 300 | 0.3 |

【Figure 10a】
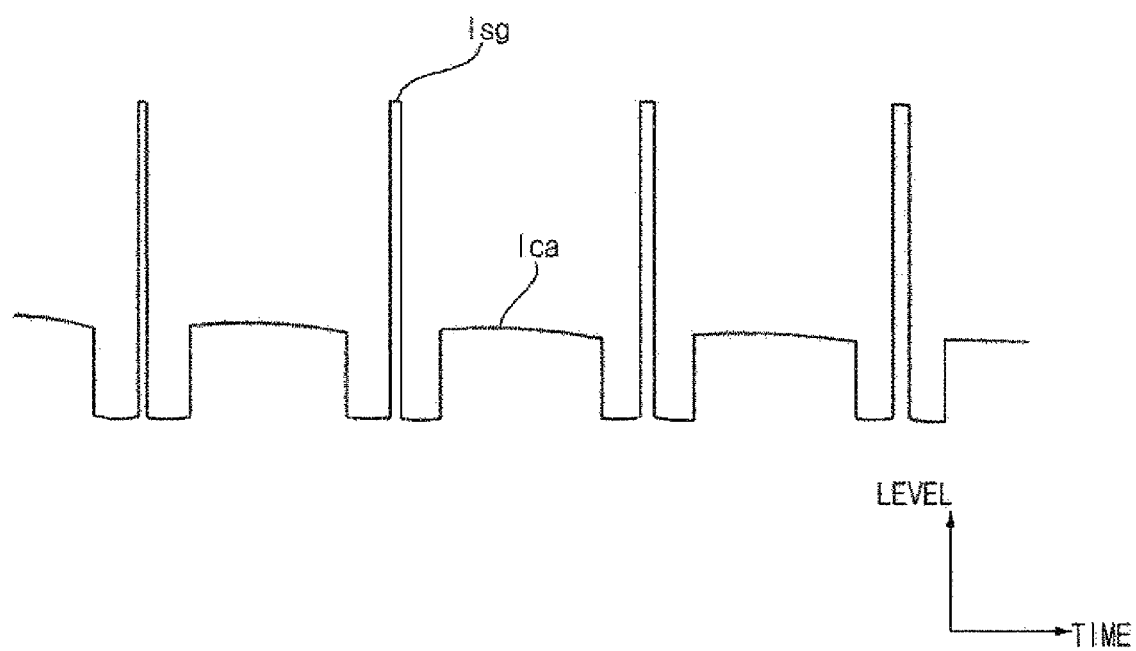

[Figure 10b]
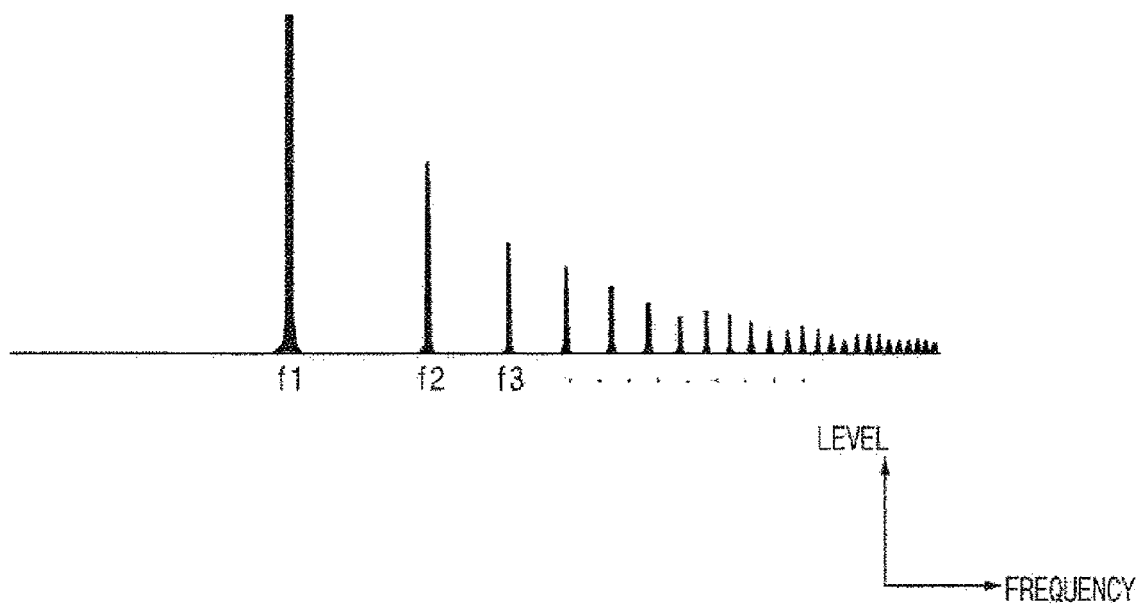

【Figure 11a】
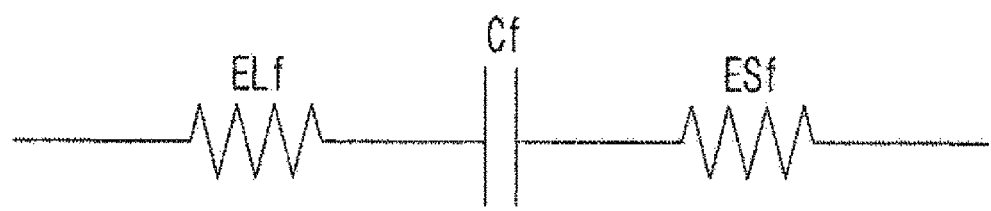
【Figure 11b】
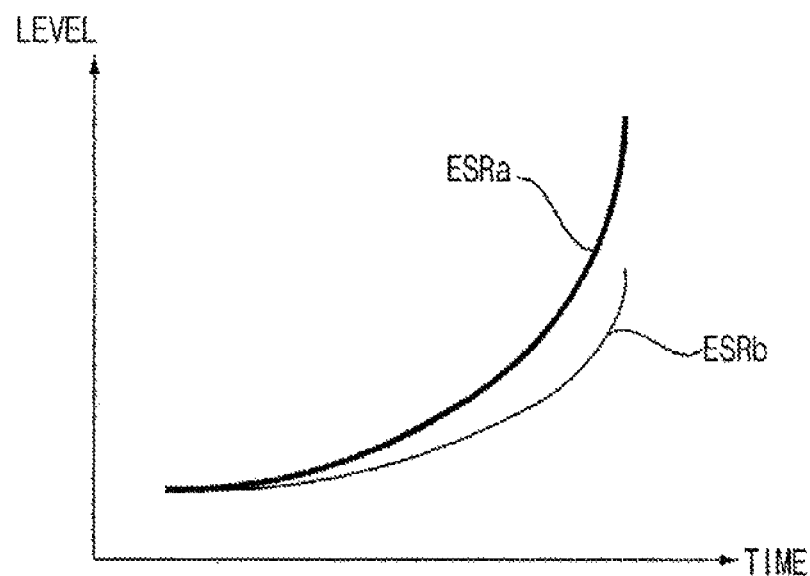

【Figure 11c】
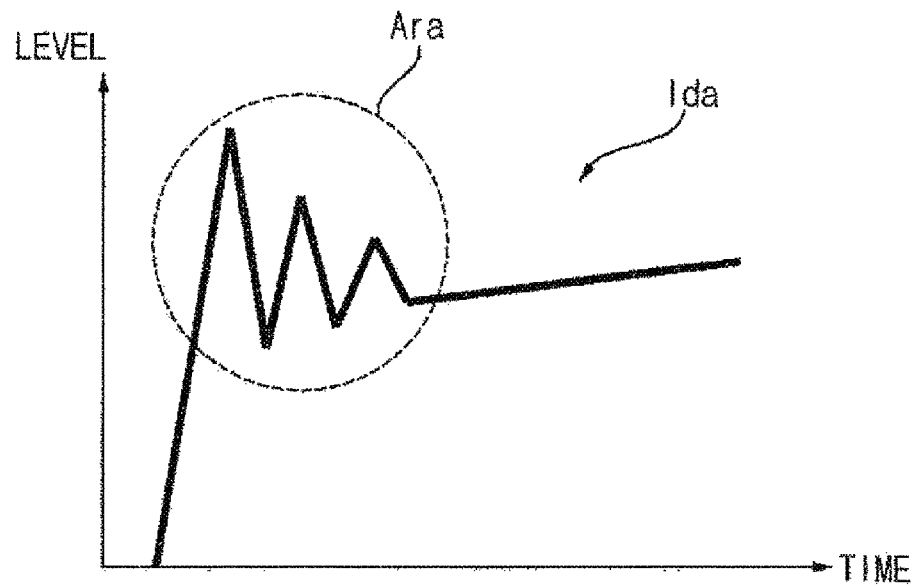
【Figure 11d】
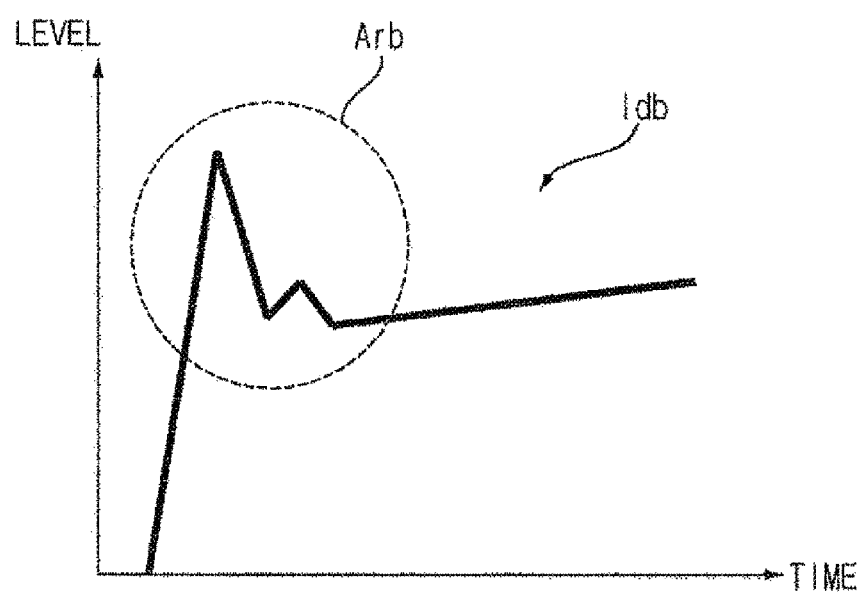

【Figure 12b】

| Freq [GHz] | PP Only ACR [mOhm] | PP+PET ACR [mOhm] |
|---|---|---|
| 1.00E-09 | 0.0548286 | 0.0559198 |
| 1.00E-08 | 0.0548292 | 0.0602447 |
| 1.00E-07 | 0.0548812 | 0.1285509 |
| 1.00E-06 | 0.0588019 | 0.4011693 |
| 1.00E-05 | 0.1041285 | 1.2796005 |
| 0.0001 | 0.2725435 | 4.0624101 |
| 0.001 | 0.8121767 | 12.86399 |
| 0.01 | 2.5208151 | 40.697526 |
| 0.1 | 7.9246879 | 128.71505 |
| 1 | 25.0134499 | 407.05095 |

[Figure 13a]
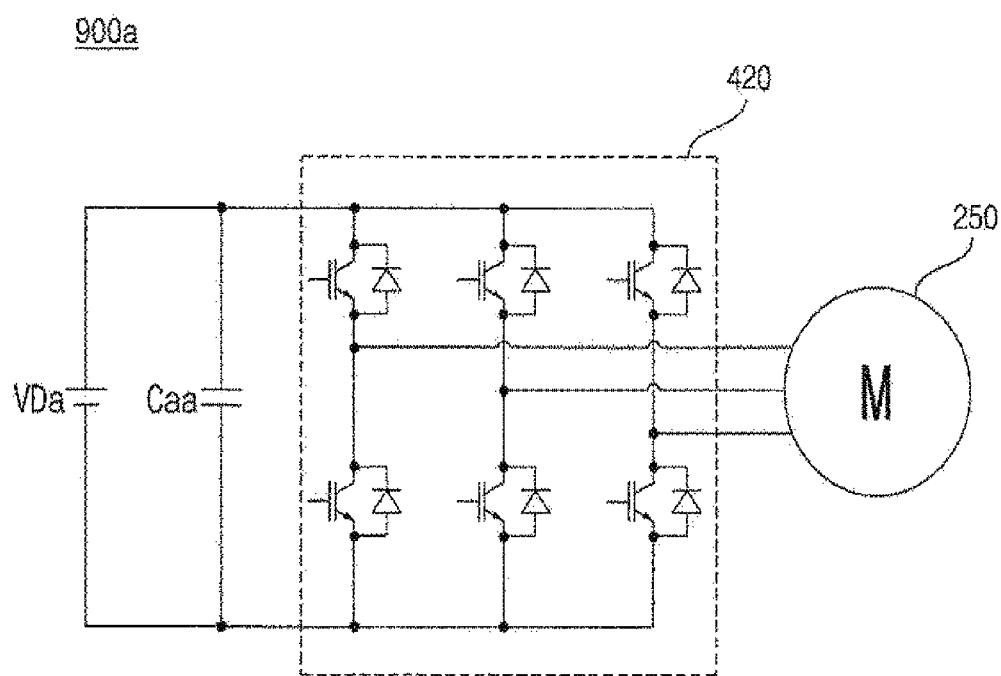

【Figure 13b】
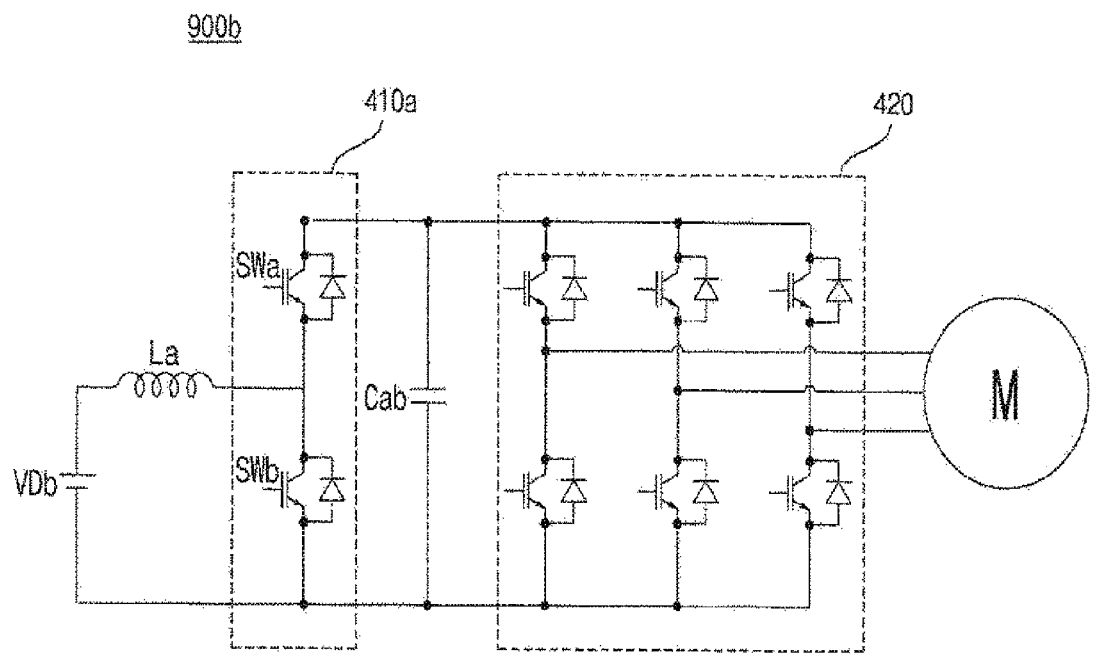

FILM CAPACITOR, POWER CONVERTING DEVICE, AND VEHICLE INCLUDING THE SAME

CROSS REFERENCE TO RELATED APPLICATIONS

This application is a Continuation of U.S. application Ser. No. 17/780,680, filed on May 27, 2022, which is the National Stage filing under 35 U.S.C. 371 of International Application No. PCT/KR2019/016750, filed in the Republic of Korea on Nov. 29, 2019, the contents of which are hereby incorporated by reference herein in their entirety.

BACKGROUND OF THE DISCLOSURE

Technical Field

The present disclosure relates to a film capacitor, and a power converting device and a vehicle including the same, and more particularly, to a film capacitor capable of reducing switching loss while suppressing a surge voltage and a surge current caused by switching of a switching element, and a power converting device and a vehicle including the same.

Related Art

Electric vehicles powered by electricity, hybrid vehicles that combine internal combustion engines with electric vehicles, or the like generate output using motors, batteries, and the like.

In order to drive a motor, a power converting device for driving the motor by using an AC power is required.

Also, the power converting device includes an inverter or the like having a plurality of switching elements. The inverter converts the input DC power into AC power, and a capacitor is used in the front end of the inverter to store and/or smooth out the input DC power.

Electrolytic capacitors were used as capacitors disposed in the front end of inverters, but have been replaced by film capacitors in view of device life, volume, and the like.

In addition, as the motor driving becomes more advanced, the switching frequency of the inverter switching element has been increased, and accordingly, the temperature of the film capacitor is increased.

In particular, when using SiC or GaN as a film capacitor for the use of a high frequency of the switching frequency or control frequency, the equivalent series resistance (ESR) increases due to the skin effect of the film capacitor, etc., and accordingly, the temperature of the film capacitor is increased, which can lead to the film capacitor swelling and even bursting or burning out.

SUMMARY OF THE DISCLOSURE

The present disclosure has been made in view of the above problems, and provides a high heat resistance film capacitor, and a power converting device and a vehicle including the same.

The present disclosure further provides a film capacitor capable of reducing ringing and dampening oscillation of a surge current, and a power converting device and a vehicle including the same.

The present disclosure further provides a film capacitor capable of reducing high frequency components, and a power converting device and a vehicle including the same.

Technical Solution

In accordance with an aspect of the present disclosure, a film capacitor, and a power converting device and a vehicle including the same include a film capacitor disposed in a DC terminal that is a front end of an inverter having a plurality of switching elements. The film capacitor includes: a first member disposed inside the film capacitor; and a second member surrounding the first member, in which a dielectric resistance of the second member is higher than a dielectric resistance of the first member.

In addition, the thickness of the first member is greater than the thickness of the second member.

Also, the thickness of the first member is approximately 10 times greater than the thickness of the second member.

Further, the thickness of the second member decreases as a switching frequency of the inverter increases.

Also, the specific gravity, melting point, relative dielectric constant, withstand voltage, and dielectric loss of the second member are greater than those of the first member.

The surge current generated in the DC terminal decreases when passing through the second member in comparison with the first member in the film capacitor.

In addition, the first member comprises polypropylene PP, and the second member comprises polyethylene terephthalate PET.

Also, film capacitor further includes a bus bar having one side which is disposed in one side of a first unit including the first member and the second member.

The thickness of the second member is thinner than the thickness of the bus bar.

Further, the film capacitor further includes a second unit which is disposed at another side of the bus bar and includes the first member and the second member.

Advantageous Effects

The film capacitor, and the power converting device and the vehicle including the same according to an embodiment of the present disclosure include a film capacitor disposed in a DC terminal that corresponds to a front end of an inverter having a plurality of switching elements. The film capacitor includes: a first member disposed inside the film capacitor; and a second member surrounding the first member, in which a dielectric resistance of the second member is higher than a dielectric resistance of the first member. Accordingly, it is possible to implement a high heat resistant film capacitor. In addition, the ringing or oscillations of the surge current can be reduced and provide better damping. In addition, the high frequency component can be reduced.

In addition, the thickness of the first member is greater than thickness of the second member. Accordingly, it is possible to implement a high heat resistant film capacitor.

Also, the thickness of the first member is approximately 10 times greater than thickness of the second member. Accordingly, it is possible to implement a high heat resistant film capacitor.

Further, the thickness of the second member decreases as switching frequency of the inverter increases.

Accordingly, the ringing of the surge current can be reduced and provide better dampening. In addition, the high frequency component can be reduced.

Also, the specific gravity, melting point, relative dielectric constant, withstand voltage, and dielectric loss of the second member are greater than those of the first member. Accordingly, the ringing of the surge current can be reduced. In addition, the high frequency component can be reduced.

In addition, the surge current generated in the dc terminal decreases when passing through the second member in comparison with the first member in the film capacitor.

Accordingly, the ringing of the surge current can be reduced. In addition, the high frequency component can be reduced.

The first member can include polypropylene PP, and the second member can include polyethylene terephthalate PET. Accordingly, it is possible to implement a high heat resistant film capacitor. In addition, the ringing of the surge current can be reduced and damped.

In addition, the film capacitor further includes a bus bar having one side which is disposed in one side of a first unit including the first member and the second member. Accordingly, it is possible to implement a high heat resistant film capacitor. In addition, the ringing of the surge current can be reduced.

Also, the film capacitor further includes a second unit which is disposed in the other side of the bus bar and includes the first member and the second member. Accordingly, it is possible to implement a high heat resistant film capacitor. In addition, the ringing of the surge current can be reduced.

BRIEF DESCRIPTION OF THE DRAWINGS

The above and other objects, features and advantages of the present disclosure will be more apparent from the following detailed description in conjunction with the accompanying drawings, in which:

FIG. 6a including parts (a) and (b) and FIG. 6b including parts (a) and (b) are views for explaining a related art film capacitor structure as a comparative example;

FIG. 7, including parts (a) and (b), show views for explaining a film capacitor structure according to an embodiment of the present disclosure;

FIGS. 8a-12b are views for explaining FIG. 7 according to embodiments of the present disclosure; and FIGS. 13a and 13b are circuit diagrams of various power converting devices employing a film capacitor according to an embodiment of the present disclosure.

DETAILED DESCRIPTION OF THE EMBODIMENTS

Reference will now be made in detail to the preferred embodiments of the present disclosure, examples of which are illustrated in the accompanying drawings. The suffixes "module" and "unit" in elements used in description below are given only in consideration of ease in preparation of the specification and do not have specific meanings or functions. Therefore, the suffixes "module" and "unit" can be used interchangeably.

Figure 1:
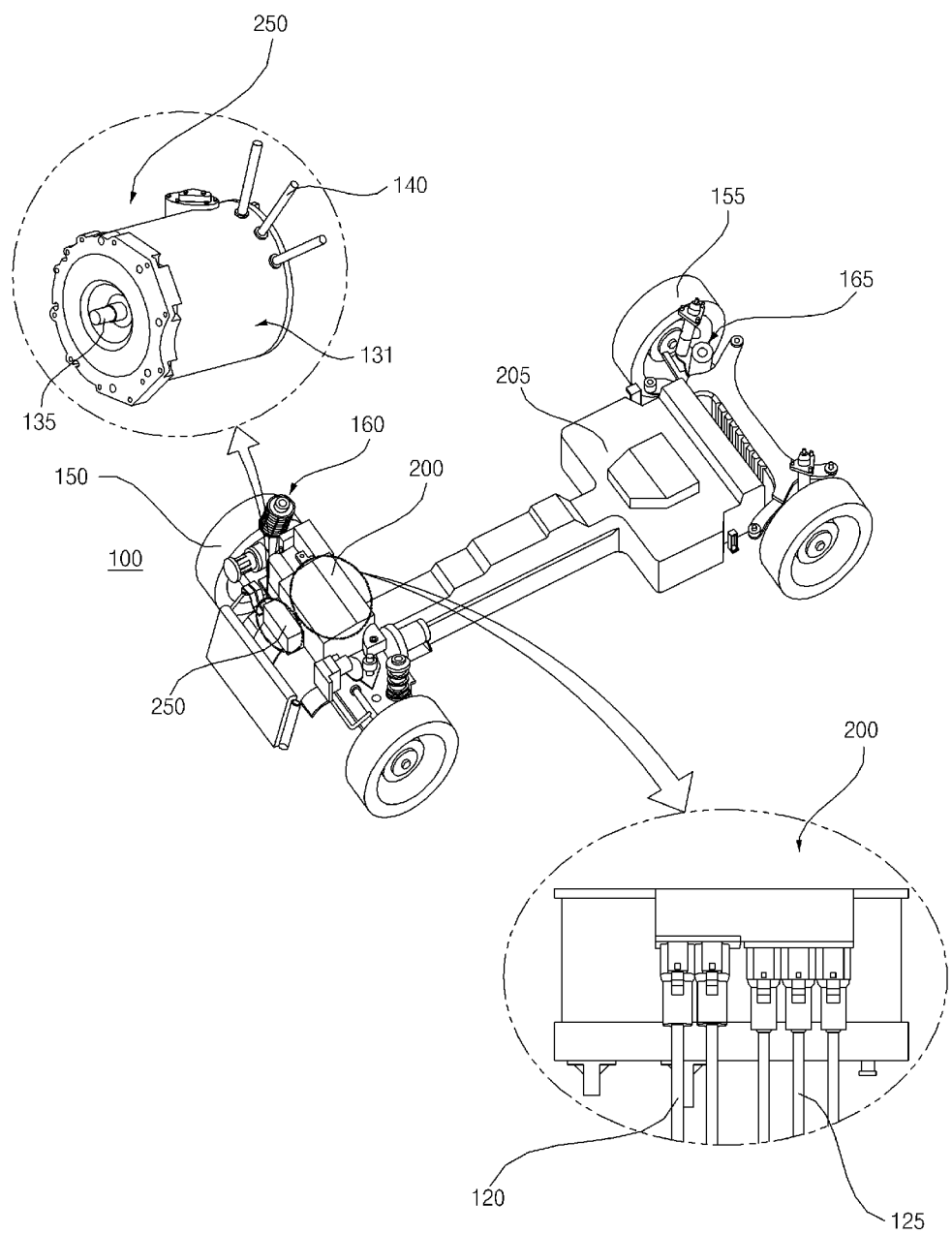
FIG. 1 is a schematic view showing a vehicle body of a vehicle according to an embodiment of the present disclosure.

FIG. 1 is a schematic view showing a vehicle body of a vehicle according to an embodiment of the present disclosure.

Referring to the drawing, a vehicle 100 according to an embodiment of the present disclosure can include a battery 205 for supplying power, a motor drive device 200 that is supplied with power from the battery 205, a motor 250 that is driven and rotated by the motor drive device 200, a front wheel 150 and a rear wheel 155 that are rotated by the motor 250, a front wheel suspension device 160 and a rear wheel suspension device 165 that prevent vibrations due to the road surface from being transmitted to a vehicle body, an inclination angle detector for detecting the inclination angle of the vehicle body. Meanwhile, a drive gear for converting the rotational speed of the motor 250 based on a gear ratio can be additionally provided.

The inclination angle detector detects the inclination angle of the vehicle body, and the detected inclination angle is input to an electronic controller described later. The inclination angle detector can be implemented as a gyro sensor or a horizontal gauge sensor.

Meanwhile, the inclination angle detector is illustrated as being disposed in the battery 205, but is not limited thereto. The inclination angle detector can be disposed in the front wheel 150, the rear wheel 155, or in both the front wheel 150 and the rear wheel 155.

The battery 205 supplies power to the motor drive device 200. In particular, direct current (DC) power is supplied to a capacitor C in the motor drive device 200.

The battery 205 can be formed of a plurality of unit cells. The plurality of unit cells can be managed by a battery management system (BMS) to maintain a constant voltage, and can emit a constant voltage by the battery management system.

For example, the battery management system can detect the voltage Vbat of the battery 205, and transmit the detected voltage Vbat to an electronic controller or an inverter controller 430 inside the motor drive device 200, can supply the DC power stored in a capacitor C in the motor drive device 200 to the battery when the battery voltage Vbat falls down to or below a lower limit. In addition, when the battery voltage Vbat rises up to or above an upper limit, DC power can be supplied to the capacitor C in the motor drive device 200.

The battery 205 is preferably configured as a secondary battery capable of charging and discharging, but is not limited thereto.

The motor drive device 200 receives DC power from the battery 205 via a power input cable 120. The motor drive device 200 converts the DC power received from the battery 205 into AC power and supplies to the motor 250. The converted AC power is preferably a three-phase AC power. The motor drive device 200 supplies three-phase AC power to the motor 250 through a three-phase output cable 125 provided in the motor drive device 200.

Although FIG. 1 shows that the motor drive device 200 has the three-phase output cable 125 composed of three cables, but three cables can be provided in a single cable.

Meanwhile, the motor drive device 200 according to an embodiment of the present disclosure will be described later with reference to FIG. 3 and below.

The motor 250 includes a stator 131 that is fixed without rotation and a rotor 135 that rotates. The motor 250 is provided with an input cable 140 to receive AC power supplied from the motor drive device 200. The motor 250 can be, for example, a three-phase motor, and the rotation speed of the rotor can be varied based on the applied frequency, when a voltage variable/frequency variable for each phase AC power is applied to the coil of the stator of each phase.

The motor 250 can be implemented in various forms, such as an induction motor, a blushless DC motor (BLDC) motor, a reluctance motor, and the like.

Meanwhile, one side of the motor 250 can be provided with a drive gear. The drive gear converts the rotational energy of the motor 250 based on the gear ratio. The rotational energy output from the drive gear is transmitted to the front wheel 150 and/or the rear wheel 155 to move the vehicle 100.

The front wheel suspension device 160 and the rear wheel suspension device 165 support the front wheel 150 and the rear wheel 155 respectively with respect to the vehicle body. The vertical direction of the front wheel suspension device 160 and the rear wheel suspension device 165 is supported by a spring or a damping mechanism so that the vibration due to the road surface does not affect the vehicle body.

The front wheel 150 can be further provided with a steering device. The steering device is a device for adjusting the direction of the front wheel 150 in order to drive the vehicle 100 in a direction intended by the driver.

In addition, the vehicle 100 can further include an electronic controller for controlling the overall electronic devices in the vehicle. The electronic controller controls each device to perform an operation, display, and the like. In addition, the above-described battery management system can be controlled.

Meanwhile, the electronic controller can generate a driving command value according to various driving modes (e.g., traveling mode, reverse mode, neutral mode, parking mode, and the like) based on a detection signal from an inclination angle detector for detecting the inclination angle of the vehicle 100, a speed detector for detecting the speed of the vehicle 100, a brake detector according to the motion of the brake pedal, an accelerator detector according to the motion of the accelerator pedal, and the like. The driving command value at this time can be, for example, a torque command value.

Meanwhile, the vehicle 100 according to the embodiment of the present disclosure can include a hybrid electric vehicle using a battery and a motor while using an engine, as well as a pure electric vehicle using a battery and a motor.

In this situation, the hybrid electric vehicle can further include a switching means capable of selecting at least one of a battery and an engine, and a transmission.

Meanwhile, the hybrid electric vehicle can be divided into a series method of driving the motor by converting the mechanical energy output from the engine into electrical energy, a parallel method of using the mechanical energy output from the engine and the electrical energy from the battery at the same time, and a series-parallel method of mixing them.

Figure 2:
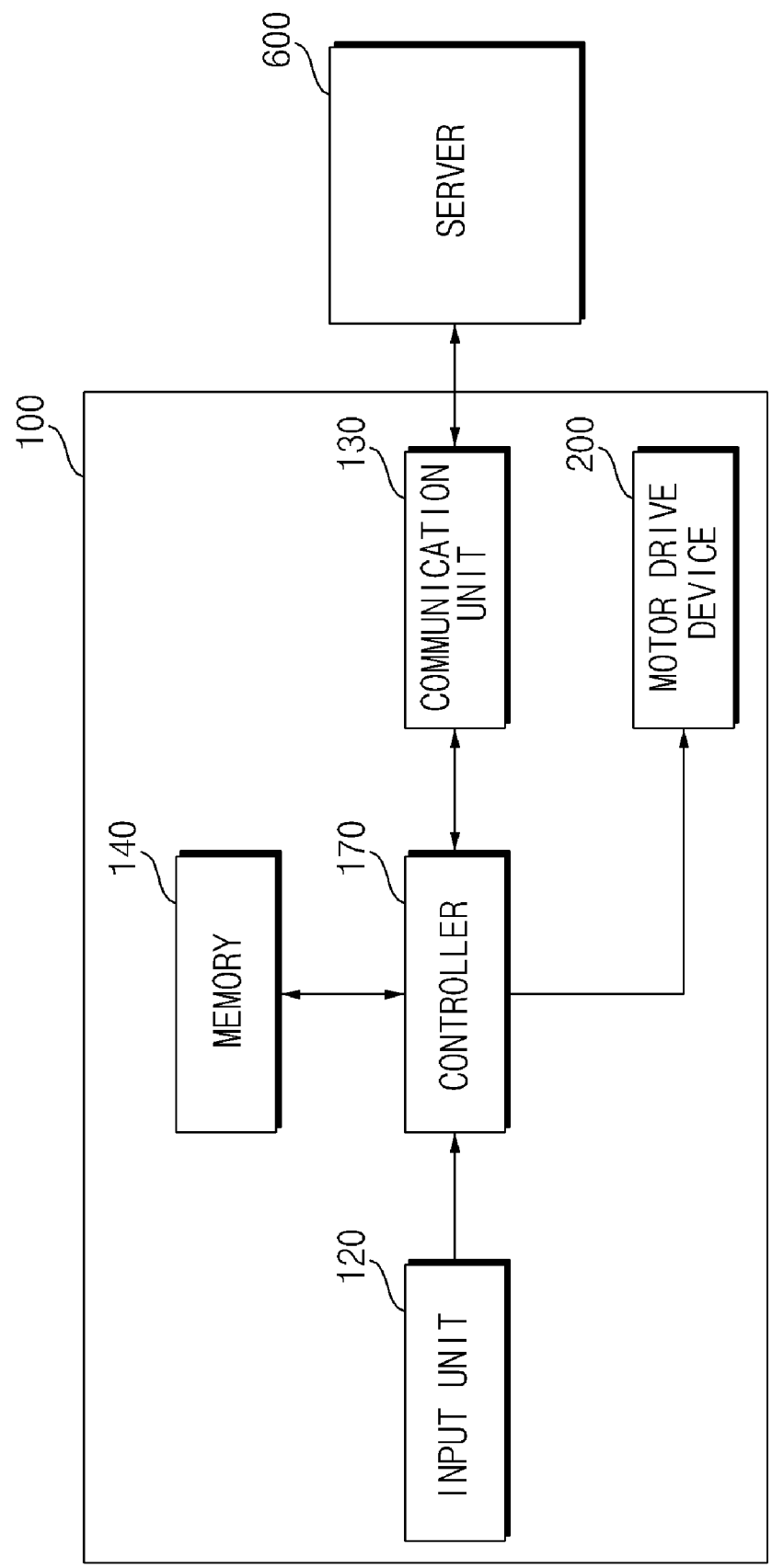
FIG. 2 is an example of a motor drive system according to an embodiment of the present disclosure.

FIG. 2 is an example of a motor drive system according to an embodiment of the present disclosure.

Referring to the drawing, the motor drive system 10 according to an embodiment of the present disclosure can include a vehicle 100 and a server 600.

Here, the server 600 can be a server operated by the manufacturer of the motor drive device 200 or the vehicle 100, or can correspond to a mobile terminal of the driver of the motor drive device 200 or the vehicle 100.

Meanwhile, the vehicle 100 can include an input unit 120, a communication unit 130, a memory 140, a controller 170, and a motor drive device 200.

The input unit 120 can include an operation button, a key, and the like, and output an input signal for power on/off, operation setting, etc. of the vehicle 100.

The communication unit 130 can exchange data with an external device, for example, the server 600 by wire or wirelessly, or can exchange data wirelessly with a remote server, or the like. For example, the communication unit 130 can perform mobile communication, such as 4G or 5G, infrared (IR) communication, RF communication, BLUETOOTH communication, ZIGBEE communication, WiFi communication, and the like.

Meanwhile, the memory 140 of the vehicle 100 can store data necessary for the operation of the vehicle 100. For example, the memory 140 can store data related to an operation time, an operation mode, and the like during operation of the drive unit 200.

In addition, the memory 140 of the vehicle 100 can store management data including power consumption information of the vehicle, recommended driving information, current driving information, and management information.

In addition, the memory 140 of the vehicle 100 can store diagnostic data including operation information, driving information, and error information of the vehicle.

The controller 170 can control each unit in the vehicle 100. For example, the controller 170 can control the input unit 120, the communication unit 130, the memory 140, the drive unit 200, and the like.

The motor drive device 200 can be referred to as a motor drive device, as a drive unit, to drive the motor 250.

Figure 5:
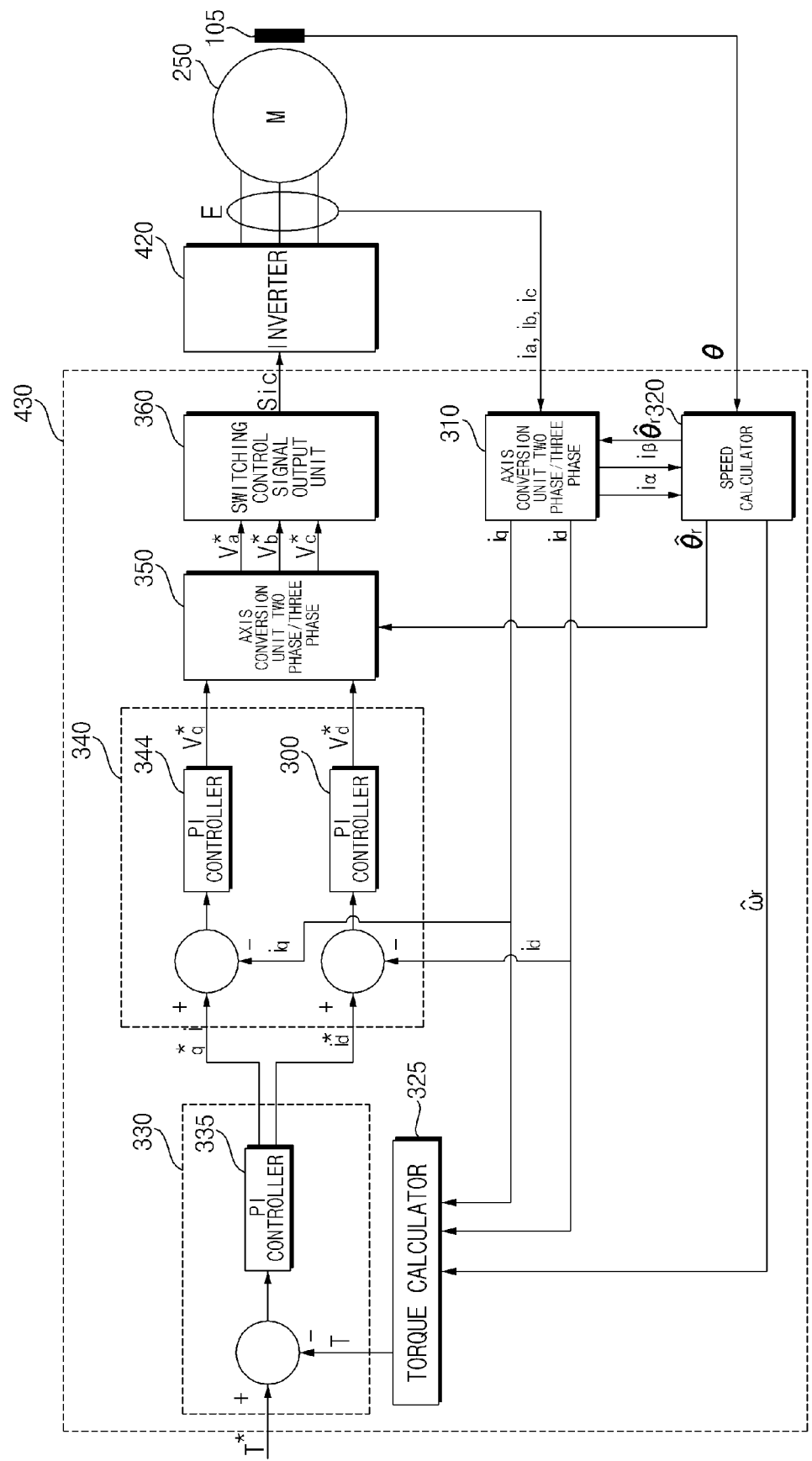
FIG. 5 is an example of an internal block diagram of an inverter controller of FIG. 4 according to an embodiment of the present disclosure.

The motor drive device 200 according to the embodiment of the present disclosure can include an inverter 420 having a plurality of switching elements and outputting alternating current (AC) power to the motor 250, an output current detector E for detecting an output current io flowing through the motor 250, and an inverter controller 430 for outputting a switching control signal to the inverter 420, based on current information (id, iq) based the output current io detected by output current detector E and torque command value T* (e.g., see FIG. 5).

Meanwhile, the current information (id, iq) based on the output current io and the torque command value T* can be transmitted to the external server 600, and can receive a current command value (i*d, i*q) from the server 600. The inverter controller 430 can output a switching control signal to the inverter 420, based on the current command value received from the communication unit 130.

Accordingly, the motor 250 can be driven based on the current command value corresponding to the maximum torque calculated in real time by the server 600. Thus, maximum torque drive of the motor 250 can be achieved.

Meanwhile, the communication unit 130 in the motor drive device 200 according to the embodiment of the present disclosure can transmit the current information (id, iq), the torque command value T*, and the voltage information related to the detected dc terminal voltage Vdc to the server 600. Accordingly, the maximum torque drive of the motor 250 under various conditions can be achieved.

Meanwhile, the detailed operation of the motor drive device 200 is described with reference to FIG. 3.

Figure 3:
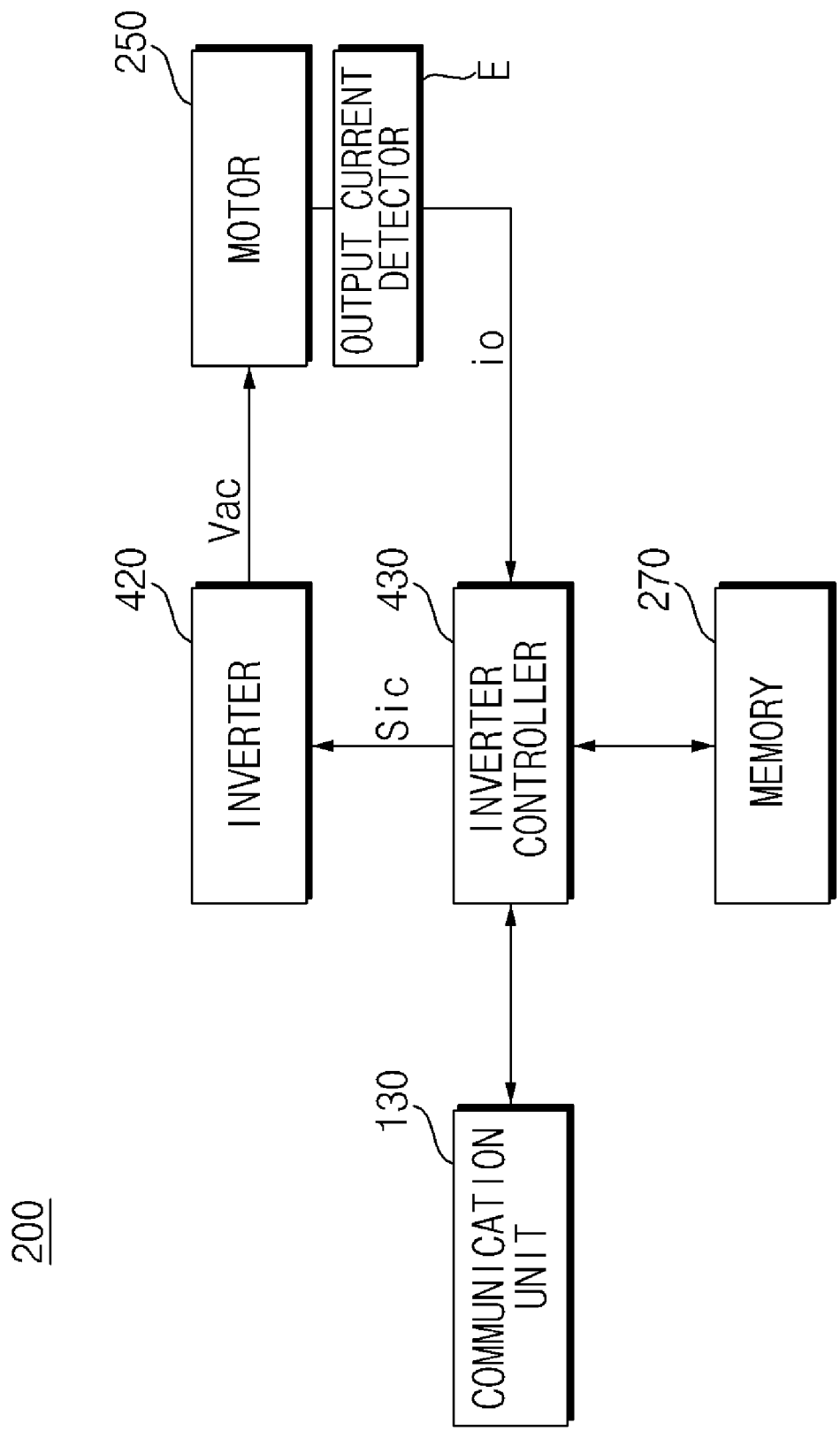
FIG. 3 illustrates an example of an internal block diagram of a motor drive device of FIG. 2 according to an embodiment of the present disclosure.

FIG. 3 illustrates an example of an internal block diagram of a motor drive device of FIG. 2.

Figure 4:
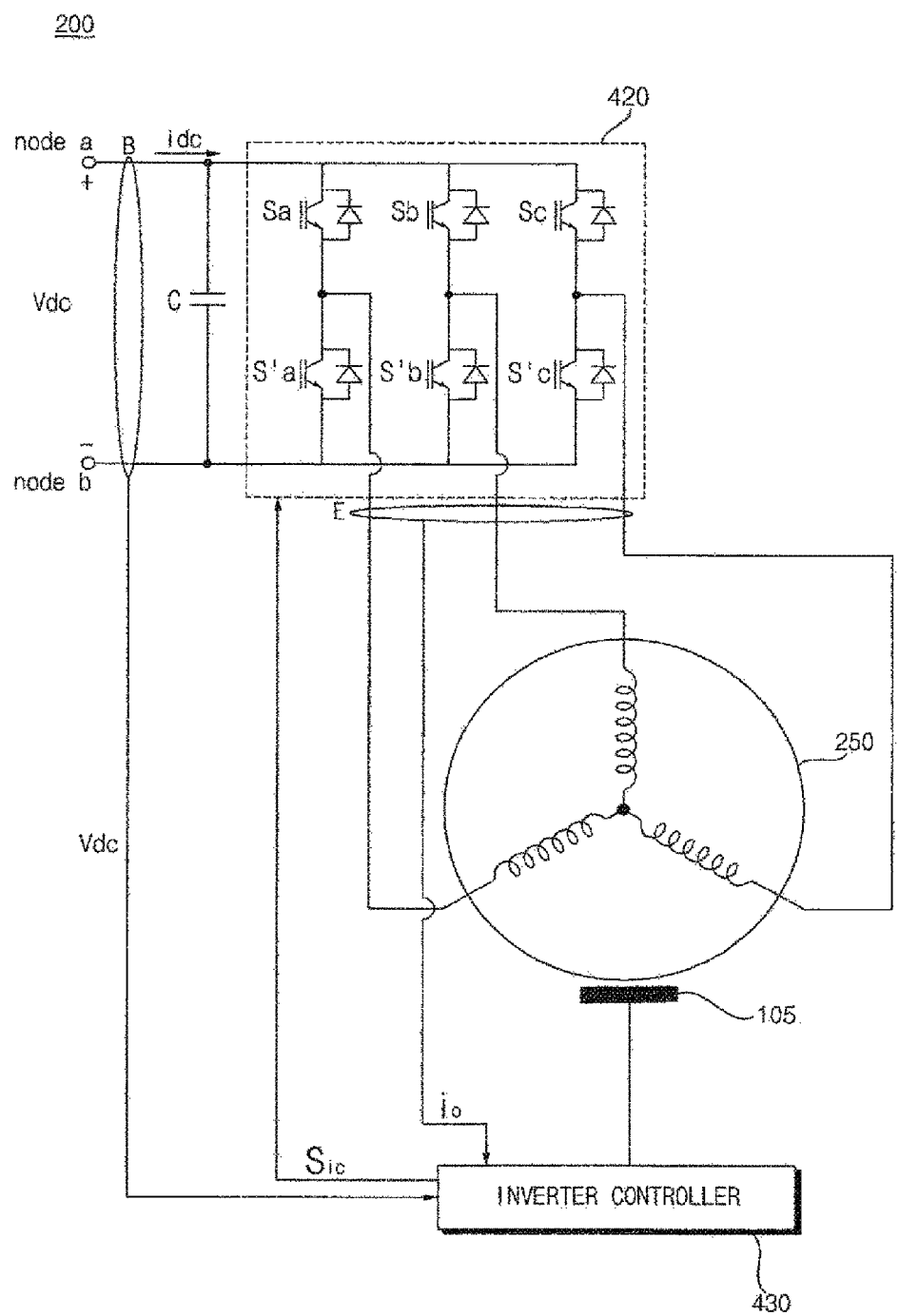
FIG. 4 is an example of an internal circuit diagram of the motor drive device of FIG. 3 according to an embodiment of the present disclosure.

Referring to the drawing, the motor drive device 200 according to the embodiment of the present disclosure is a drive device for driving the motor 250, and can include an inverter 420 which has a plurality of switching elements (Sa Sc, S'a S'c) and outputs AC power to the motor 250, and an inverter controller 430 for controlling the inverter 420 (e.g., see FIG. 4). Further, motor drive device 200 can include a memory 270 that provides various stored data to the inverter controller 430.

Meanwhile, the motor drive device 200 according to the embodiment of the present disclosure can further include a capacitor C for storing a voltage Vdc of the dc terminal which is the input terminal of the inverter 420, a dc terminal voltage detector B for detecting the dc terminal voltage Vdc, and an output current detector E for detecting an output current flowing through the motor 250 (e.g., see FIG. 4).

According to the embodiment of the present disclosure, the motor 250 can be a three-phase motor driven by the inverter 420.

Meanwhile, the inverter controller 430 can output the switching control signal Sic to the inverter 420, based on the current command value (i*d, i*q) corresponding to the calculated maximum torque. Accordingly, maximum torque driving of the motor 250 can be achieved.

The inverter controller 430 according to the embodiment of the present disclosure calculates the current information (id, iq) and the torque command value T* in real time, calculates the current command value (i*d, i*q) based on the torque command value T*, and drives the motor 250 using the current command values (i*d, i*q). Accordingly, the accuracy for high efficiency driving is improved.

Meanwhile, the motor drive device 200 can further include a capacitor C for storing the dc terminal voltage Vdc, which is an input terminal of the inverter 420, and a dc terminal voltage detector (B) for detecting the dc terminal voltage Vdc.

The inverter controller 430 calculates the current command value (i*d, i*q), based on the current information id, iq, the torque command value T*, and the detected dc terminal voltage Vdc, and drives the motor 250 by using the current command value i*d and i*q. Accordingly, the accuracy for high efficiency driving is improved (e.g., see FIG. 4).

FIG. 4 is an example of an internal circuit diagram of the motor drive device of FIG. 3.

Referring to the drawing, the motor drive device 200 according to an embodiment of the present disclosure can include the inverter 420, the inverter controller 430, the output current detector E, the dc terminal voltage detector Vdc, and a position detection sensor 105.

Meanwhile, since the motor drive device 200 converts electric power to drive the motor, the motor drive device 200 can be referred to as a power converting device.

The dc terminal capacitor C stores the power input to the dc terminal (a-b terminal). In the drawing, a single device is exemplified as the dc terminal capacitor C, but a plurality of devices can be provided to ensure device stability.

Meanwhile, the input power supplied to the dc terminal capacitor C can be a power stored in the battery 205 or a power that is level-converted by a converter.

Meanwhile, since both ends of the dc terminal capacitor C store the DC power, these can be referred to as a dc terminal or a dc link terminal.

The dc terminal voltage detector B can detect the voltage Vdc of the dc terminal that is both ends of the dc terminal capacitor C. To this end, the dc terminal voltage detector B can include a resistor, an amplifier, and the like. The detected dc terminal voltage Vdc, as a discrete signal in the form of a pulse, can be input to the inverter controller 430.

As shown in FIG. 4, inverter 420 can include a plurality of inverter switching elements (Sa~Sc, S'a~S'c), and the turning on/off operation of the switching element (Sa~Sc, S'a~S'c) can convert the DC power Vdc into three-phase AC power Va, Vb, Vc having a certain frequency and output to the three-phase synchronous motor 250.

In the inverter 420, the upper arm switching element Sa, Sb, Sc and the lower arm switching element S'a, S'b, S'c, which are connected in series with each other, form a pair, and a total of three pairs of upper and lower arm switching elements are connected in parallel with each other (Sa&S'a, Sb&S'b, Sc&S'c). Diodes are connected in anti-parallel to each of the switching elements Sa, S'a, Sb, S'b, Sc, S'c.

The switching elements in the inverter 420 perform on/off operation of the respective switching elements based on the inverter switching control signal Sic from the inverter controller 430. Thus, the three-phase AC power having a certain frequency is output to the three-phase synchronous motor 250.

The inverter controller 430 can control a switching operation of the inverter 420, based on a sensorless method.

To this end, the inverter controller 430 can receive an output current io detected by the output current detector E.

The inverter controller 430 can output an inverter switching control signal Sic to each gate terminal of the inverter 420 in order to control the switching operation of the inverter 420. Accordingly, the inverter switching control signal Sic can be referred to as a gate driving signal.

Meanwhile, the inverter switching control signal Sic is a switching control signal of the pulse width modulation method PWM, and is generated and output based on the output current io detected by the output current detector E.

The output current detector E detects the output current io flowing between the inverter 420 and the three-phase motor 250. That is, the current flowing in the motor 250 can be detected.

The output current detector E can detect all of the output currents ia, ib, ic of each phase, or can detect the output currents of two phases by using three-phase equilibrium.

The output current detector E can be positioned between the inverter 420 and the motor 250, and a current transformer (CT), a shunt resistor, or the like can be used for current detection.

The detected output current io, as a discrete signal in the form of a pulse, can be applied to the inverter controller 430, and a switching control signal Sic is generated based on the detected output current io.

Meanwhile, the three-phase motor 250 includes a stator and a rotor, and AC power of each phase having a certain frequency is applied to a coil of the stator of each phase (a, b, c phase), so that the rotor rotates.

Such a motor 250 can include, for example, a Surface-Mounted Permanent-Magnet Synchronous Motor (SMPMSM), an Interior Permanent Magnet Synchronous Motor (IPMSM), a Synchronous Reluctance Motor (Synrm), and the like. Among these, SMPMSM and IPMSM are a permanent magnet synchronous motor (PMSM) to which a permanent magnet is applied, and Synrm has no permanent magnet.

Meanwhile, the motor 250 according to the embodiment of the present disclosure is described mainly based on an Interior Permanent Magnet Synchronous Motor (IPMSM).

FIG. 5 is an example of an internal block diagram of an inverter controller of FIG. 4.

Referring to the drawing, the inverter controller 430 of FIG. 5 can receive the detected output current io from the output current detector 320, and receive rotor position information θ of the motor 250 from the position detection sensor 105.

The position detection sensor 105 can detect the magnetic pole position θ of the rotor of the motor 250. That is, the position detection sensor 105 can detect the position of the rotor of the motor 250.

To this end, the position detection sensor 105 can include an encoder, a resolver, or the like.

In the following descriptions, the coordinate system and coordinate axis used are defined here.

The αβ coordinate system is a two-dimensional fixed coordinate system whose axes are α and β axes which are fixed axes. The α and β axes are orthogonal to each other, and the β axis leads the α axis by electrical angle 90°.

The dq coordinate system is a two-dimensional rotary coordinate system having d and q axes that are rotational axis. In the rotary coordinate system that rotates at the same speed as the rotational speed of the magnetic flux made by the permanent magnet of the motor 250, the axis according to the direction of the magnetic flux made by the permanent magnet is the d axis, and the axis that leads the d axis by electrical angle 90 degrees is the q axis.

Referring to FIG. 5, the inverter controller 430 can include a speed calculator 320, an axis conversion unit 310, a torque calculator 325, a current command generation unit 330, a voltage command generation unit 340, an axis conversion unit 350, and a switching control signal output unit 360.

The axis conversion unit 310 in the inverter controller 430 receives the three-phase output current (ia, ib, ic) detected by the output current detector E, and converts into a two-phase current (iα, iβ) of the stationary coordinate system.

Meanwhile, the axis conversion unit 310 can convert the two-phase current (iα, iβ) of the stationary coordinate system into a two-phase current (id, iq) of the rotary coordinate system.

The speed calculator 320 in the inverter controller 430 estimates the rotor position of the motor 250, based on the two-phase current (iα, iβ) of the stationary coordinate system converted by the axis conversion unit 310. In addition, based on the estimated rotor position θr, the calculated speed ωr can be output (e.g., see FIG. 5).

The torque calculator 325 in the inverter controller 430 can calculate the current torque T, based on the calculated speed ω̃r.

The current command generation unit 330 in the inverter controller 430 generates the current command values (i*d, i*q), based on the calculated current torque T and the torque command value T*.

For example, the current command generation unit 330 performs a PI control in a PI controller 335, based on the calculated current torque T and the torque command value T*, and can generate the current command value (i*d, i*q). Meanwhile, the value of the d-axis current command value i*d can be set to zero.

Meanwhile, the current command generation unit 330 can further include a limiter for restricting the level so that the current command value (i*d, i*q) does not exceed an allowable range.

Next, the voltage command generation unit 340 generates d-axis and q-axis voltage command values (V*d, V*q), based on the d-axis and q-axis currents (id, iq) that are axis-converted into two-phase rotary coordinate system by the axis conversion unit, and the current command value (i*d, i*q) in the current command generation unit 330, or the like.

For example, the voltage command generation unit 340 can perform the PI control in the PI controller 344, based on a difference between the q-axis current iq and the q-axis current command value i*q, and can generate the q-axis voltage command value V*q. In addition, the voltage command generation unit 340 can perform the PI control in the PI controller 348, based on a difference between the d-axis current id and the d-axis current command value i*d, and can generate the d-axis voltage command value V*d. Meanwhile, the value of the d-axis voltage command value V*d can be set to zero, in correspondence with the situation where the value of the d-axis current command value i*d is set to zero.

Meanwhile, the voltage command generation unit 340 can further include a limiter for restricting the level so that the d-axis and q-axis voltage command values (V*d, V*q) do not exceed the allowable range.

Meanwhile, the generated d-axis and q-axis voltage command values (V*d, V*q) are input to the axis conversion unit 350.

The axis conversion unit 350 receives the position θr calculated by the speed calculator 320 and the d-axis and q-axis voltage command values (V*d, V*q), and performs axis conversion.

First, the axis conversion unit 350 performs conversion from a two-phase rotary coordinate system to a two-phase stationary coordinate system. In this situation, the position θr calculated by the speed calculator 320 can be used.

In addition, the axis conversion unit 350 performs conversion from two-phase stationary coordinate system to three-phase stationary coordinate system. Through this conversion, the axis conversion unit 350 outputs the three-phase output voltage command value (V*a, V*b, V*c).

The switching control signal output unit 360 generates and outputs a switching control signal Sic according to the pulse width modulation PWM method based on the three-phase output voltage command value (V*a, V*b, V*c).

The output inverter switching control signal Sic can be converted into a gate driving signal by a gate drive unit, and input to the gate of each switching element in the inverter 420. Thus, each of the switching elements (Sa, S'a, Sb, S'b, Sc, S'c) in the inverter 420 performs a switching operation.

Meanwhile, the situation where the dc terminal capacitor C shown in FIG. 4 is made of polypropylene (PP) will be described with reference to FIGS. 6a and 6b.

FIGS. 6a and 6b are views for explaining a related art film capacitor structure as a comparative example.

First, FIG. 6a is a view illustrating a related art film capacitor CPx structure.

As shown in FIG. 6a, part (a), a hollow polypropylene PP 702 is increased in length to the left and right sides, while the thickness decreases due to a vertical pressing.

Thus, a polypropylene PP-based member 704 is formed.

Meanwhile, as shown in part (b) of FIG. 6a, when a bus bar BSB is disposed in one side of the polypropylene PP-based member 704, a capacitor CPx structure can be formed.

Such a related art film capacitor CPx can be used as the dc terminal capacitor, as described above.

Meanwhile, when the switching frequency of the inverter switching element (Sa~Sc, S'a~S'c) increases as the motor driving level increases, the temperature of the film capacitor CPx increases.

FIG. 6b, part (a) is an image Ima which photographed the film capacitor CPx of low temperature state, and part (b) in FIG. 6b is an image Imb which photographed the film capacitor CPx of high temperature state.

Since the internal temperature of part (b) in FIG. 6b is increased in comparison with part (a) in FIG. 6b, a phenomenon that the surface of the film capacitor CPx is swollen occurs (e.g., the capacitor can swell and burst or burn out).

Specifically, in part (a) in FIG. 6b, the switching frequency of the inverter 420 is 10 kHz, whereas in part (b) in FIG. 6b, the switching frequency of the inverter 420 is 500 kHz. Accordingly, a phenomenon that the surface of the film capacitor CPx of part (b) in FIG. 6b is swollen occurs, and the volume increases when the temperature increases, thereby increasing the possibility of burnout.

Meanwhile, when the switching frequency is increased, if analyzing the factors of temperature increase, a low frequency component due to the switching frequency during switching of the inverter 420 and a high frequency component due to the ringing component of the surge current during switching are generated.

At this time, the high frequency component passes through the outside of the film capacitor CPx and the bus bar BSB, and the low frequency component passes evenly through the outside of the film capacitor CPx.

Therefore, since both the high frequency component and the low frequency component generated during switching pass outside the film capacitor CPx, heat generation occurs due to the current component flowing over an entire frequency band.

Due to this phenomenon, the possibility of burnout of the film capacitor CPx increases. Therefore, in the situation of SiC, GaN, or a wideband GAP semiconductor, the merit of the film capacitor CPx is not sufficient.

Accordingly, the present disclosure proposes a film capacitor for high heat resistance, even when the switching frequency is increased. In particular, a film capacitor capable of reducing high frequency components while reducing the ringing of the surge current is proposed. This will be described with reference to FIG. 7 and below.

FIG. 7 is a view for explaining a film capacitor structure according to an embodiment of the present disclosure, FIGS. 8a to 12b are views for explaining FIG. 7.

First, the capacitor CP according to the embodiment of the present disclosure of part (a) in FIG. 7 includes a first member PP disposed inside and a second member PET surrounding the first member PP.

The first member PP can have a hollow portion, and the thickness of the first member PP and the second member PET can increase in the left and right sides while the thickness decreases due to the vertical pressing. For example, first member PP can for a type of obround shape or elliptic cylindrical shell around the second member PET.

Meanwhile, according to the embodiment of the present disclosure, it is preferable that the dielectric resistance of the second member PET is higher than the dielectric resistance of the first member PP.

When the dielectric resistance of the second member PET is higher than the dielectric resistance of the first member PP, the high frequency component due to ringing of the surge current generated during the switching of the inverter 420 does not pass through the outside or is reduced, due to the second member PET being disposed outside of the first member PP.

That is, the surge current generated in the dc terminal (a-b terminal) decreases more when passing through the second member PET than the first member PP in the film capacitor Cpm. Thus, the ringing of the surge current can be reduced. In addition, the high frequency component can be reduced.

Therefore, the temperature increase due to the high frequency component generated during switching of the inverter 420 is reduced, with respect to the capacitor CP. Accordingly, it is possible to implement a high heat resistant film capacitor CPm.

Meanwhile, the thickness ha of the first member PP is larger than the thickness hb of the second member PET. Accordingly, it is possible to implement a high heat resistant film capacitor CPm.

Meanwhile, as the switching frequency of the inverter 420 increases, it is preferable that the thickness hb of the second member PET decreases.

For example, in consideration of the skin effect due to the thickness hb of the second member PET, the thickness of the skin through which the current flows is inversely proportional to the frequency. Accordingly, it is preferable that the thickness hb of the second member PET decreases, as the frequency increases. For example, the thickness hb of the second member PET can be predetermined and set based on a desired switching frequency of the inverter (e.g., if the frequency of the inverter is high, then the thickness hb of the second member can be set to a thin thickness, and if the frequency of the inverter is low, then the thickness hb of the second member can be set to a large thickness).

Meanwhile, the inverter switching frequency can be approximately 10 kHz to 40 kHz, and thus the switching noise can be 1 to 100 MHz. Accordingly, it is preferable that the thickness ha of the first member PP is approximately 10 times larger than the thickness hb of the second member PET. As a result, it is possible to implement a high heat resistant film capacitor CPm.

Meanwhile, as shown in part (b) of FIG. 7, the capacitor CPms according to the embodiment of the present disclosure can include a first member PP disposed on the inside, a first unit CPma including a second member PET surrounding the first member PP, a second unit CPmb including a second member PET surrounding the first member PP, and a bus bar BSB disposed between the first unit CPma and the second unit CPmb.

The first unit CPma and the second unit CPmb can be spaced apart from each other, and the bus bar BSB of a metal member can be disposed therebetween. For example the capacitor CPms can have a stacked pair of capacitors (CPma, CPmb) with a bus bar BSB disposed there between.

That is, the capacitor CPms according to the embodiment of the present disclosure further includes the bus bar BSB having one side disposed in one side of the first unit CPma including the first member PP and the second member PET. Accordingly, it is possible to implement a high heat resistant film capacitor CPm. In addition, the ringing of the surge current can be reduced.

Meanwhile, the capacitor CPms according to the embodiment of the present disclosure further includes the second unit CPmb which is disposed in the other side of the bus bar BSB and includes the first member PP and the second member PET. Accordingly, it is possible to implement a high heat resistant film capacitor CPm. In addition, the ringing of the surge current can be reduced.

Meanwhile, as shown in the drawing, it is preferable that the thickness hb of the second member PET is thinner than the thickness of the bus bar BSB. FIG. 8a illustrates a capacitor CPx structure based on FIG. 6a, and FIG. 8b illustrates a capacitor CPm structure of the present disclosure based on FIG. 7.

When comparing FIG. 8a and FIG. 8b, there is a difference in that FIG. 8a is configured to include only polypropylene PP, and FIG. 8B includes the first member PP disposed on the inside and the second member PET surrounding the first member PP, and the dielectric resistance of the second member PET is higher than the dielectric resistance of the first member PP.

Meanwhile, the first member PP can include polypropylene PP, and the second member PET can include polyethylene terephthalate PET. Also, as shown in FIG. 8A, the capacitor CPx can have a stacked pair of capacitors (704, 705) with a bus bar BSB disposed there between, in which each of the capacitors (704, 705) has an obround shape or elliptic cylinder shape, and the bus bar BSB can have a rectangular plate shape.

According to FIG. 9, among the features of polyethylene terephthalate (PET) which is the second member, the specific gravity, melting point, relative dielectric constant, withstand voltage, and dielectric loss are greater in comparison with the polypropylene PP which is the first member. Accordingly, it is possible to implement a high heat resistant film capacitor CPm. In addition, the ringing of the surge current can be reduced, and the high frequency component can be reduced.

FIG. 10a is a view illustrating a square wave current Isg of a high frequency component and a switching frequency current Ica of a low frequency component.

When the square wave current Isg of high frequency component and the switching frequency current Ica of low frequency component flow through the film capacitor CPm or the film capacitor CPms, as described above, the high frequency component is reduced due to the second member PET surrounding the first member PP.

FIG. 10b is a view illustrating frequency analysis in a film capacitor CPm or a film capacitor CPms according to the embodiment of the present disclosure.

As shown in the drawing, the magnitude of the high frequency component decreases, and the magnitude of the low frequency component is mainly remained.

Meanwhile, FIG. 11a illustrates an actual modeling circuit diagram of the film capacitor.

Referring to the drawing, the film capacitor can be modeled as equivalent series inductance ESL, equivalent series resistance ESR, in addition to the capacitance Cf.

According to the object of the present disclosure, in order to reduce the high frequency components and to implement high heat resistance film capacitance, it is preferable that the equivalent series resistance ESR is increased according to frequency and the noise current decreases.

FIG. 11b illustrates an equivalent series resistance ESR curve for each frequency of the related art film capacitor CPx of FIG. 6a, and the film capacitor CPm or CPms of FIG. 7 according to embodiments of the present disclosure.

Referring to the drawing, the equivalent series resistance ESR curve for each frequency of the conventional film capacitor CPx is represented by ESRb, and the equivalent series resistance ESR curve for each frequency of the film capacitor (CPm or CPms) of the present disclosure is represented by ESRa.

In the situation of the film capacitor (CPm or CPms) of the present disclosure, as the frequency level increases, it can be seen that the level of the equivalent series resistance ESR increases. Thus, according to the film capacitor (CPm or CPms) of the present disclosure, a high frequency component can be reduced.

FIG. 11c illustrates the noise current curve Ida of the related art film capacitor CPx, and FIG. 11d illustrates the noise current curve Idb of the film capacitor (CPm or CPms) according to embodiments of the present disclosure.

In comparison with the noise current curve Ida of the related art film capacitor CPx, it can be seen that the peak value, and the like are reduced in the noise current curve Idb of the film capacitor (CPm or CPms) according to embodiments of the present disclosure. Accordingly, the noise component in the film capacitor (CPm or CPms) of the present disclosure is further reduced. In particular, the ringing noise of the surge current can be reduced and the film capacitor (CPm or CPms) of the present disclosure provides better damping. As shown in FIG. 11b the film capacitor (CPm/CPms) according to embodiments of the present disclosure provides more optimal damping (e.g., Arb) when compared to the related art example capacitor in FIG. 11a which has many oscillations (e.g., Ara).

Figure 12A:
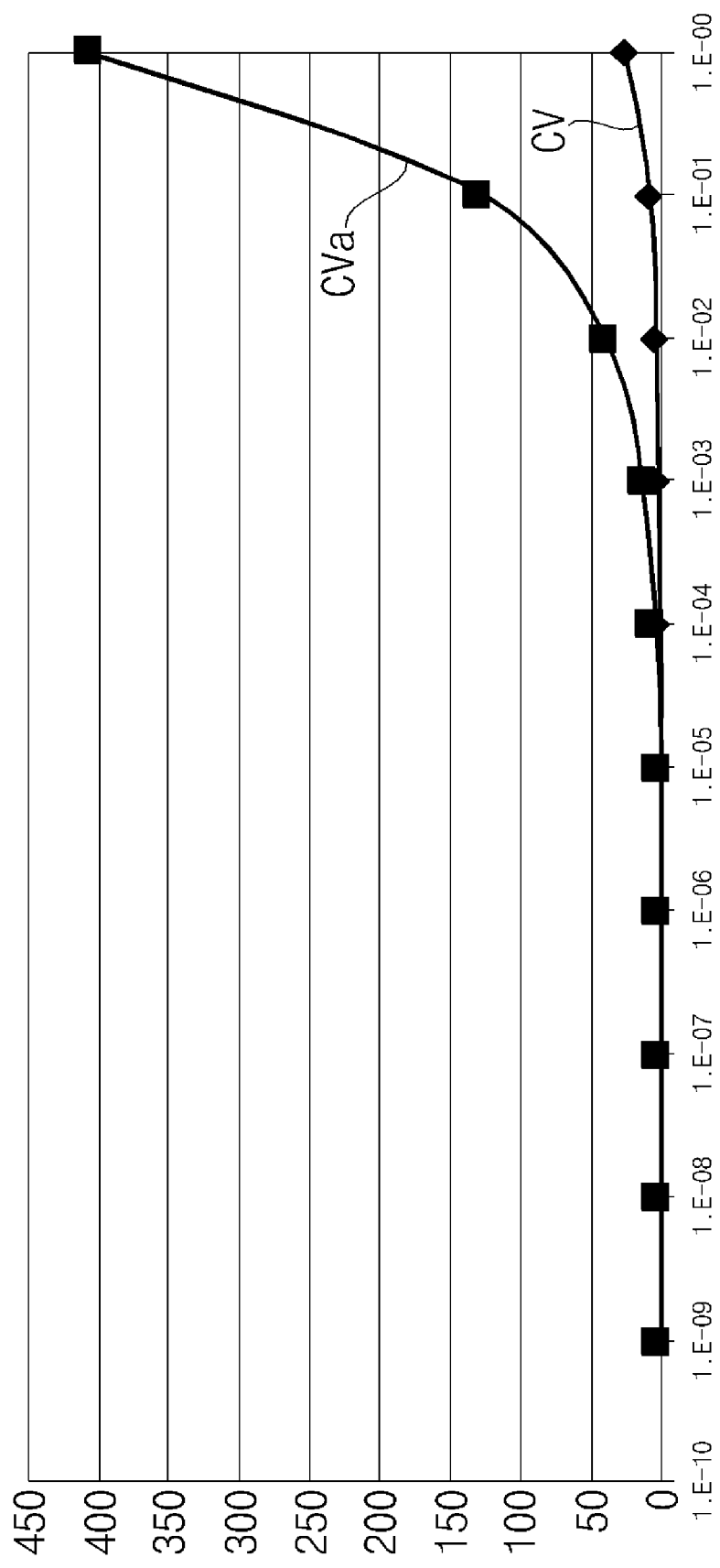

FIGS. 12a and 12b illustrate the equivalent series resistances of the related art film capacitor CPx of FIG. 6a, and the equivalent series resistance for each frequency of the film capacitor (CPm or CPms) of the present disclosure of FIG. 7.

Referring to FIG. 12a, the equivalent series resistance ESR curve for each frequency of the related art film capacitor CPx is represented by CV, and the equivalent series resistance ESR curve for each frequency of the film capacitor (CPm or CPms) of the present disclosure is represented by CVa.

As shown in FIGS. 12a and 12b, in the situation of the film capacitor (CPm or CPms) of the present disclosure, as the frequency increases, the level of the equivalent series resistance ESR increases. Thus, according to the film capacitor (CPm or CPms) of the present disclosure, the high frequency component can be reduced.

Meanwhile, the film capacitor (CPm or CPms) of the present disclosure described in FIGS. 7 to 12b can be employed in various power converting devices.

FIGS. 13a and 13b are circuit diagrams of various power converting devices employing a film capacitor according to an embodiment of the present disclosure.

First, the power converting device 900a of FIG. 13a can include a capacitor Caa storing a DC power VDa and an inverter 420 that outputs an AC power to a load, such as the motor 250, by using a voltage between both ends of the capacitor Caa.

In this situation, the capacitor Ca can be the film capacitor (CPm or CPms) of the present disclosure described with reference to FIGS. 7 to 12b.

Next, the power converting device 900b of FIG. 13b can include a converter 410a for converting the level of the DC power VDb, a capacitor Cab for storing the DC power from the converter 410a, and an inverter 420 that outputs an AC power to a load, such as the motor 250, by using a voltage between both ends of the capacitor Caa.

The converter 410a can include a switching element (SWa, SEb), and can also include an inductor La.

In this situation, the capacitor Cab can be the film capacitor (CPm or CPms) of the present disclosure described with reference to FIGS. 7 to 12b.

By employing the high heat resistant film capacitor (CPm or CPms) in the power converting device 900a, 900b of FIGS. 13a and 13b, the high frequency component can be reduced while reducing the ringing noise of the surge current. Therefore, the stability of the circuit element is improved.

Meanwhile, the power converting device (900a, 900b) of FIGS. 13a and 13b can be applied to various devices, such as vehicles, drones, and home appliances (e.g., fridges, air conditioners, washing machines, vacuum cleaners, dryers, water purifiers, cooking appliances, and the like), robots, solar modules, energy storage devices, and the like provided with an inverter.

The film capacitor according to the embodiment of the present disclosure, the power converting device and the vehicle having the same are not limited to the configuration and method of the embodiments described as described above, but all or part of each of the embodiments can be configured to be selectively combined to achieve various modifications.

Although the example embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

INDUSTRIAL APPLICABILITY

The present disclosure relates to a film capacitor, and a power converting device and a vehicle including the same.

What is claimed is:

1. A film capacitor for positioning at a direct current (DC) terminal at a front end of an inverter having a plurality of switching elements, the film capacitor comprising:
a first member; and
a second member surrounding the first member,
wherein a first thickness of the first member is greater than a second thickness of the second member,
wherein a surge current generated in the DC terminal decreases when passing through the second member in comparison with the first member in the film capacitor.

2. The film capacitor of claim 1, wherein the first thickness of the first member is approximately 10 times greater than the second thickness of the second member.

3. The film capacitor of claim 1, wherein a second thickness of the second member is set based on a switching frequency of the inverter or the film capacitor.

4. The film capacitor of claim 1, wherein a second specific gravity, a second melting point, a second relative dielectric constant, a second withstand voltage and a second dielectric loss of the second member are greater than a first specific gravity, a first melting point, a first relative dielectric constant, a first withstand voltage and a first dielectric loss of the first member, respectively.

5. The film capacitor of claim 1, wherein the first member comprises polypropylene (PP), and the second member comprises polyethylene terephthalate (PET).

6. The film capacitor of claim 1, further comprising a bus bar disposed at a side of the first member and the second member.

7. The film capacitor of claim 6, wherein a second thickness of the second member is less than a thickness of the bus bar.

8. The film capacitor of claim 6, further comprising:
a third member; and
a fourth member surrounding the third member,
wherein a fourth dielectric resistance of the fourth member is higher than a third dielectric resistance of the third member.

9. A power converting device comprising the film capacitor of claim 1.

10. A vehicle comprising the power converting device of claim 9.

11. The film capacitor of claim 8, wherein the bus bar is disposed between the second member and the fourth member.

12. The film capacitor of claim 8, wherein the first and second members form a first obround shape, and
wherein the third and fourth members form a second obround shape.

13. The film capacitor of claim 6, wherein the bus bar has a rectangular plate shape.

14. A film capacitor, comprising:
a first part including a first member and a second member surrounding the first member;
a second part including a third member and a fourth member surrounding the third member; and
a bus bar disposed between the first part and the second part,
wherein the second member is thinner than the first member, and
wherein the fourth member is thinner than the third member.

15. The film capacitor of claim 14, wherein the first part has a first obround shape,
wherein the second part has a second obround shape, and
wherein the bus bar has a rectangular plate shape.

16. The film capacitor of claim 14, wherein the bus bar is thicker than each of the second and fourth members.

17. The film capacitor of claim 14, wherein the first and third members are made of a same first type of material, and
wherein the second and fourth members are made of a same second type of material different than the same first type of material.

18. The film capacitor of claim 17, wherein the first and third members include polypropylene (PP), and
wherein the second and fourth members include polyethylene terephthalate (PET).

* * * * *